US012299752B2

(12) United States Patent
Murashin

(10) Patent No.: US 12,299,752 B2
(45) Date of Patent: *May 13, 2025

(54) SYSTEMS AND METHODS FOR GENERATING SERVER-SUGGESTED DATA BASED ON ALGORITHMIC ANALYSIS OF HISTORICAL AND GEOGRAPHICAL PROFILE DATA

(71) Applicant: Certinia Inc., Austin, TX (US)

(72) Inventor: Aleksei Murashin, Harrogate (GB)

(73) Assignee: Certinia Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,397

(22) Filed: May 11, 2023

(65) Prior Publication Data

US 2023/0281725 A1 Sep. 7, 2023

Related U.S. Application Data

(63) Continuation of application No. 17/676,509, filed on Feb. 21, 2022, now Pat. No. 11,704,744, which is a
(Continued)

(51) Int. Cl.
*G06F 16/332* (2025.01)
*G06F 40/174* (2020.01)
(Continued)

(52) U.S. Cl.
CPC ......... *G06Q 40/12* (2013.12); *G06F 16/3322* (2019.01); *G06F 40/174* (2020.01); *G06T 7/20* (2013.01); *G06V 30/412* (2022.01)

(58) Field of Classification Search
None
See application file for complete search history.

(56) References Cited

U.S. PATENT DOCUMENTS 8,316,296 B2  11/2012  Paek et al.
9,286,266 B1  3/2016  Fleck
(Continued)

OTHER PUBLICATIONS

Cai et al., "Itinerary Recommender System with Semantic Trajectory Pattern Mining from Geo-tagged Photos", Expert Systems with Applications, vol. 94, Mar. 15, 2018, ISSN 0957-4174, https://dol.org/10.1016/j.eswa.2017.10.049, pp. 32-40.

*Primary Examiner* — Ariel Mercado-Vargas
(74) *Attorney, Agent, or Firm* — Carr & Ferrell LLP

(57) ABSTRACT

Techniques are described, including obtaining user journey information based on a combination of electronic scheduling data, location-based data, image capture data, or motion sensing data; formulating a journey-specific suggestion based on the obtained user journey information, the journey-specific suggestion being indicative of a recent journey taken by the user; formulating a user-specific suggestion based on the obtained journey information; formulating a generic suggestion irrespective of the user journey information; receiving input for a computing device, the received input including selection of a control element on a user interface displayed on the computing device and textual input for the selected control element; and in response to the received input, causing prioritized display of a plurality of suggestions as input for the selected control element such that the journey-specific suggestion is prioritized over the user-specific suggestion, which is prioritized over the generic suggestion.

22 Claims, 7 Drawing Sheets

Related U.S. Application Data continuation of application No. 16/130,946, filed on Sep. 13, 2018, now Pat. No. 11,256,860.

(51) Int. Cl.
 *G06Q 40/12* (2023.01)
 *G06T 7/20* (2017.01)
 *G06V 30/412* (2022.01)

(56) References Cited

U.S. PATENT DOCUMENTS

| | | | |
|---|---|---|---|
| 9,754,226 | B2 | 9/2017 | Zheng et al. |
| 9,891,971 | B1 | 2/2018 | Kuhhirte |
| 10,635,748 | B2 | 4/2020 | Liu et al. |
| 11,038,974 | B1 | 12/2021 | Koukoumidis |
| 11,256,860 | B2 | 2/2022 | Murashin |
| 11,704,744 | B2 | 7/2023 | Murashin |
| 2005/0257148 | A1 | 11/2005 | Goodman et al. |
| 2007/0250258 | A1* | 10/2007 | Hager ............... G06Q 10/10 701/533 |
| 2011/0276565 | A1 | 11/2011 | Zengh et al. |
| 2012/0089331 | A1 | 4/2012 | Schmidt |
| 2013/0036117 | A1* | 2/2013 | Fisher ............... G06F 16/435 707/736 |
| 2013/0085908 | A1* | 4/2013 | Singh ............... G06Q 10/06 705/30 |
| 2013/0090090 | A1* | 4/2013 | Rivere ............... G08G 1/202 455/457 |
| 2014/0012502 | A1 | 1/2014 | Joshi et al. |
| 2014/0317102 | A1* | 10/2014 | Cooper ............... G06F 16/9537 707/724 |
| 2015/0032366 | A1 | 1/2015 | Man et al. |
| 2015/0161271 | A1 | 6/2015 | Gur |
| 2017/0161651 | A1 | 6/2017 | Demarchi et al. |
| 2017/0263144 | A1 | 9/2017 | Horan |
| 2017/0268892 | A1 | 9/2017 | Singh et al. |
| 2017/0337634 | A1* | 11/2017 | Ehrlich ............... H04L 67/52 |
| 2018/0336642 | A1 | 11/2018 | Miller |
| 2019/0188739 | A1* | 6/2019 | Champaneria ..... G06Q 30/0202 |
| 2019/0205368 | A1 | 7/2019 | Wang et al. |
| 2019/0354625 | A1 | 11/2019 | Toudji |
| 2020/0089745 | A1 | 3/2020 | Murashin |
| 2022/0284179 | A1 | 9/2022 | Murashin |

* cited by examiner

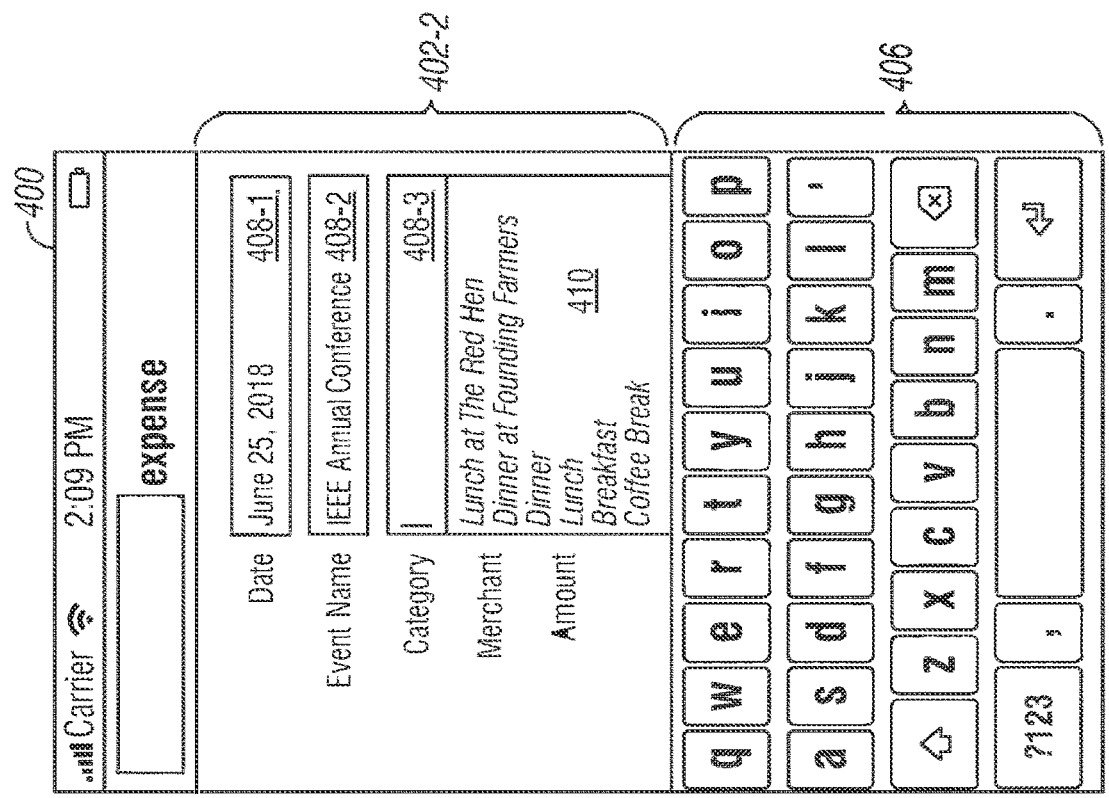

SYSTEMS AND METHODS FOR GENERATING SERVER-SUGGESTED DATA BASED ON ALGORITHMIC ANALYSIS OF HISTORICAL AND GEOGRAPHICAL PROFILE DATA

CROSS-REFERENCE TO RELATED APPLICATIONS

This nonprovisional patent application is a continuation of U.S. patent application Ser. No. 17/676,509, now U.S. Pat. No. 11,704,744, filed Feb. 21, 2022, and titled, "Server-Based Architecture for Automated Generation of Suggestive Data for Report Input Through Algorithmic Analysis of Historical and Geographical Profile Data", which is a continuation of U.S. patent application Ser. No. 16/130,946, filed Sep. 13, 2018, now U.S. Pat. No. 11,256,860 and titled, "SERVICE PROVIDER SERVER-BASED ARCHITECTURE FOR SERVER-SUGGESTED DATA," all of which is herein incorporated by reference in its entirety for all purposes.

FIELD

The disclosed teachings relate to techniques for presenting data entry suggestions on a graphical user interface (GUI). The disclosed teachings more particularly relate to techniques for improving the efficiency and accuracy for self-reporting user activities by formulating and presenting data entry suggestions on a GUI in a manner that facilitates completing self-reporting forms.

BACKGROUND

Expense reporting has traditionally been a stand-alone process initiated by employees who wish to receive reimbursements. The employee is often tasked with tracking expenses, maintaining records of expenses or receipts, determining which expenses qualify for reimbursement, completing forms by listing specific expenses and detailed information about the merchants, submitting the forms for reimbursement and waiting to obtain a reimbursement payment. While the employee is waiting to receive a reimbursement payment, the employee typically receives the bills for the expenses and is often required to pay the bills prior to receiving the reimbursement from her employer. Employees often use a paper form, or a stand-alone expense reporting software product, or a word processor or spreadsheet software to manually enter expense data from receipts and itineraries, print a report, and submit the report to the employer. Such expense report generation processes are complex, burdensome, and time-consuming.

Existing expense reporting software tools facilitate the reporting by automating data entry and automatically generating reports communicated to an employer for approval and reimbursement. Although automation should expedite completion of an expense reporting process, existing reporting tools create more problems than they solve. For example, expense reporting in paper form was typically left to experienced individuals such that expense reports had fewer errors but required more manual effort upfront. In contrast, fully automated expense reporting software allows any individual with minimum literacy in expense reporting to complete expense reports by clicking on a few buttons and inputting minimal information. Although fully automating expense reporting saves effort upfront, the resulting expense reports are riddled with errors that require extensive editing on the backend. As such, modern expense reporting software merely shifts efforts to backend workers. Accordingly, existing computerized expense reporting techniques do not minimize data entry, reduce management, or streamline the overall process, and realize little if any cost-savings compared to paper form processes.

SUMMARY

Introduced here are at least one computer-implemented method and at least one apparatus. The disclosed computer-implemented method can facilitate the process for generating expense reports. The embodiments include causing display of a user interface on a computing device (e.g., smartphone). The user interface presents an expense report form including control elements (e.g., text entry boxes). The method further includes presenting suggestions as inputs for a selected control element such that any suggestion that is formulated based on any journey taken by the user is prioritized for display over any generic suggestion that is unrelated to any specific journey taken by the user.

Another embodiment is an apparatus that causes performance of the disclosed computer-implemented method described above. Other aspects of the disclosed embodiments will be apparent from the accompanying figures and detailed description.

This Summary is provided to introduce a selection of concepts in a simplified form that are further explained in the Detailed Description. This Summary is not intended to identify key features or essential features of the claimed subject matter, nor is it intended to be used to limit the scope of claimed subject matter.

BRIEF DESCRIPTION OF THE DRAWINGS

Various embodiments of the invention are disclosed in the following detailed description and the accompanying drawings:

FIG. 4A illustrates a view of a graphical user interface (GUI) of a self-reporting app with a banner of suggested data entries according to some embodiments of the present disclosure;

FIG. 4B illustrates another view of the GUI with a dropdown list of suggested data entries according to some embodiments of the present disclosure;

DETAILED DESCRIPTION

Figure 1:
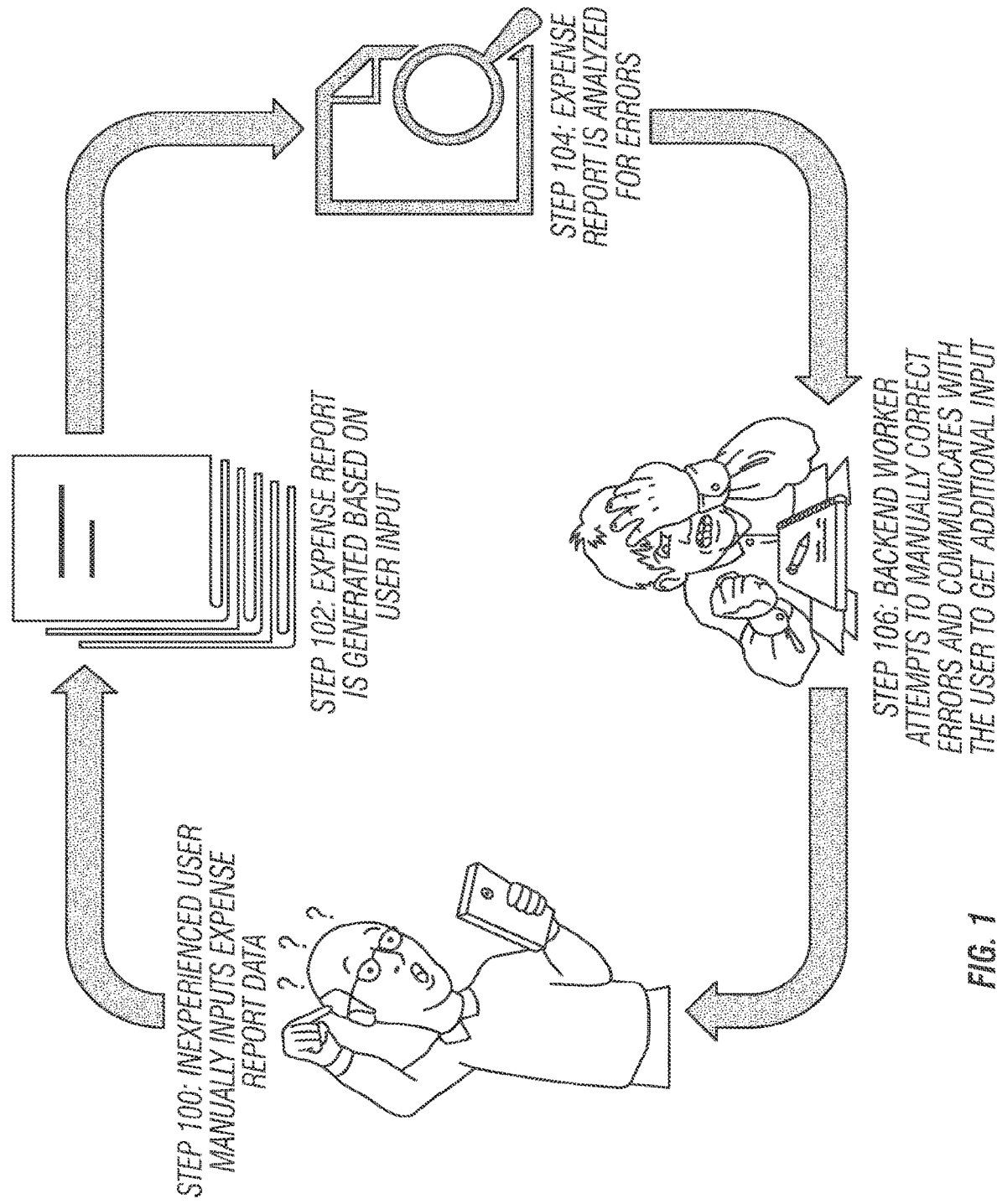
FIG. 1 is a diagram that illustrates a conventional process for generating expense reports.

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed here. It should be understood that these concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof.

In common usage, an "expense" may refer to an outflow of money to another person or group to pay for an item or service, or for a category of costs. For a tenant, rent is an expense. For students or parents, tuition is an expense. Buying food, clothing, furniture or an automobile is often referred to as an expense. Hence, an expense is a cost that is "paid" or "remitted," usually in exchange for something of value. In common usage, an "expense report" may track expenses incurred by a user (e.g., employee) during the course of performing a job function (referred to herein as a "journey"). Examples include charges for transportation, gas, meals, parking, or lodging.

Completing a paper form expense reporting process is labor-intensive and time-consuming because an experienced administrative assistant is required to complete an accurate expense report. Modern solutions include software tools that distribute labor to end-users that can self-report their expenses to administrators that can check and approve completed expense reports. Although automated systems expedite processing, they introduce errors that could be avoided if users had greater experience with expense reporting.

The disclosed techniques overcome these drawbacks because they facilitate self-reporting of user activities (e.g., expense reporting) by formulating and presenting suitable data entry suggestions as inputs for completing reporting forms displayed on a graphical user interface. In one example, any suggestions that are formulated based on the user's most recent journey are prioritized over suggestions formulated based on the user's historical information, which are prioritized over all other suggestions. As such, the disclosed embodiments improve efficiency and reduce errors that result when inexperienced and unaided users complete expense reports.

For example, FIG. 1 is a diagram that illustrates a conventional process for generating expense reports. In step 100, an inexperienced user opens a self-reporting app on a smartphone. The user attempts to manually complete an expense form based on the user's recollection of a business trip. In step 102, the self-reporting service generates an expense report based on the user's input. The process for generating an expense report may include performing automated tasks such as spellcheck or comparing entries against permitted entries to ensure that the expense report is at least minimally acceptable. In step 104, the expense report is analyzed and flagged for potential errors. In step 106, a backend worker then attempts to manually correct any errors identified in the process and typically needs to communicate with the inexperienced user for additional input. This cycle continues until a suitable expense report is complete. In some cases, the backend worker and inexperienced user engage in a communication to complete the expense reporting process, which defeats the purpose of using an automated self-reporting tool.

A solution includes fully automated expense reporting systems that can automatically collect, sort, and analyze expense related data to generate expense reports with minimal or no input from users. However, fully automated expense reporting systems would likely produce reports that are riddled with errors because they lack a clear understanding of a user's journey due to the limited information that is available to create an expense report. As a result, fully automated systems are labor intensive for backend workers that need to correct expense reports that were generated automatically.

The disclosed embodiments overcome these drawbacks with at least one technique for facilitating self-reporting. In some embodiments, a self-reporting service administers a portal rendered on a consumer electronic device that facilitates data entry with suitable suggestions for user selection to complete an expense report. For example, rather than providing an expense template/form with blank text fields that accept data from a user to complete an expense report, the disclosed embodiments can prompt a user to input journey-specific or user-specific suggested entries in the text fields.

The suggestions are formulated based on the user's journey information and presented in a manner that prioritizes and/or sorts the display of more relevant information. The most relevant information may include suggestions formulated based on the user's most recent journey, followed by suggestions based on historical information about the user's prior journeys, followed by generic suggestions (e.g., autocomplete entries). As such, the disclosed embodiments can facilitate a self-reporting process of expense reports that have a reduced amount of errors compared to existing techniques.

Figure 2:
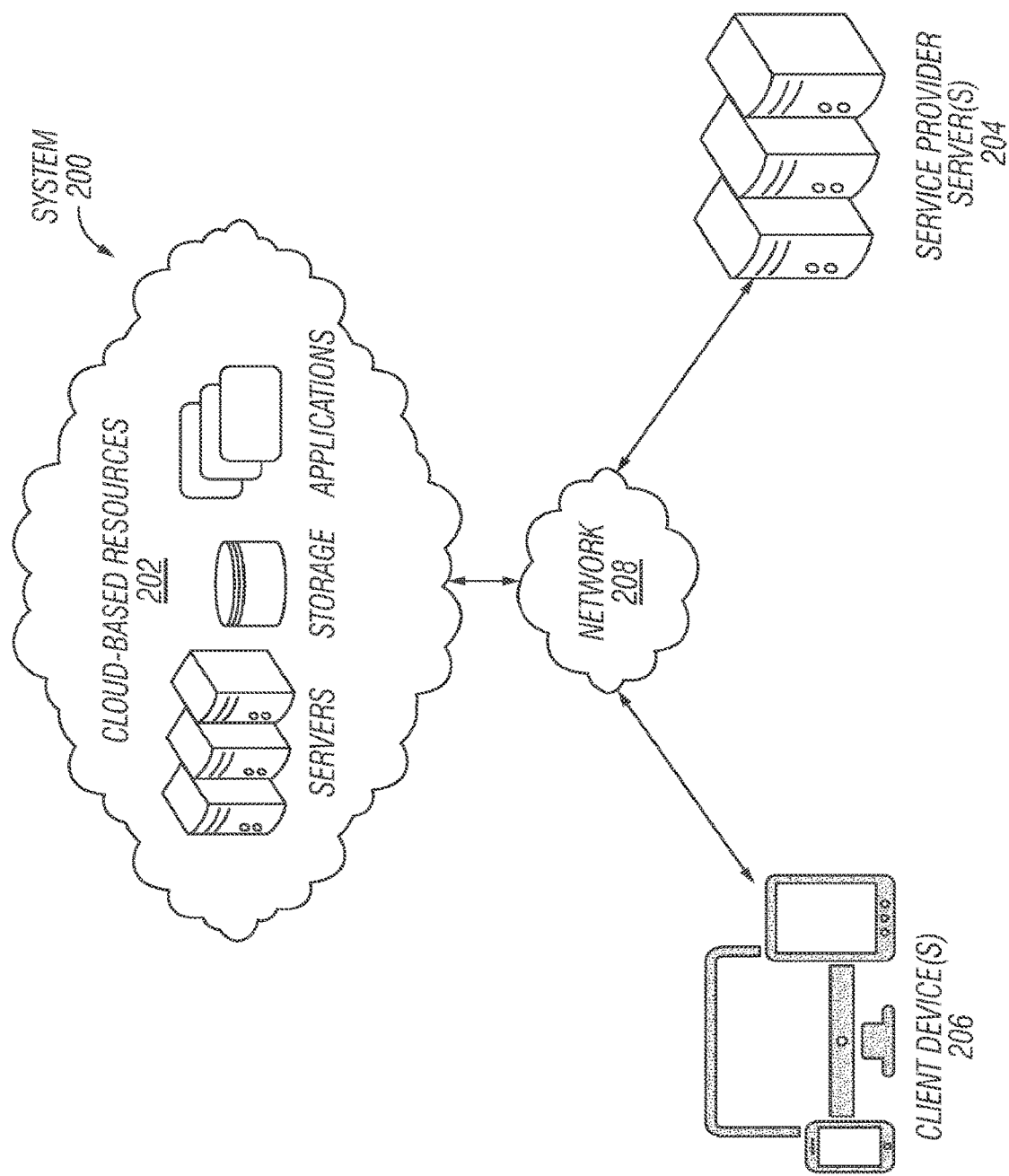
FIG. 2 is a block diagram that illustrates a computing system that can implement the disclosed technology according to some embodiments of the present disclosure.

FIG. 2 is a block diagram illustrating a computing system that can implement the disclosed technology according to some embodiments of the present disclosure.

The system 200 includes components such as cloud-based resources 202, one or more service provider servers 204 that use the cloud-based resources 202 to provide applications for expense reporting to client devices 206, which are interconnected over a network 208, such as the Internet, to facilitate accurate self-reporting of user activities.

The network 208 may include any combination of private, public, wired, or wireless portions. Data communicated over the network 208 may be encrypted or unencrypted at various locations or along different portions of the network 208. Each component of the system 200 may include combinations of hardware and/or software to process data, perform functions, communicate over the network 208, etc. For example, any component of the system 200 may include a processor, memory or storage, a network transceiver, a display, an operating system, and application software (e.g., for providing a user portal), etc. Other components, hardware, and/or software included in the system 200 are well known to persons skilled in the art and, as such, are not shown or discussed herein.

The cloud-based resources 202 can provide access to a shared pool of configurable computing resources including servers, storage, applications, software platforms, networks, services, and the like accessible by the service provider servers 204 to offer applications to the client devices 206. The service provider servers 204 may include any number of computer devices that provide add-on applications for self-reporting services, which allow employees to self-report activities to employers. This facilitates automatically reporting expenses for goods or services purchased by a user (e.g., employee) for or during performance of a job-related function such as traveling to meet a client. Although shown separately from the cloud-based resources 202, the service provider servers 204 may be included as part of the cloud-based resources 202.

The applications can facilitate processing large volumes of data generated by businesses. For example, the service provider servers 204 can facilitate self-reporting processes of large volumes of expenses generated by numerous employees and/or for businesses that have many customers that are billed routinely for expenses. The expense report data may include charges for transportation, gas, meals, parking, or lodging by employees conducting job-related functions.

The client devices 206 are operated by users (e.g., employees of businesses subscribing to self-reporting services) that interact with the system 200. Examples of client devices include computers (e.g., Apple MacBook, Lenovo 440), tablet computers (e.g., Apple iPad, Samsung Note, Microsoft Surface), smartphones (e.g., Apple iPhone, Samsung Galaxy), and any other device that is capable of accessing the service provider servers 204 over the network 208.

In some embodiments, the service provider servers 204 may provide or administer a user interface (e.g., website, app) accessible from the client devices 206. The user interface may include menu items for selecting expense forms and dashboard analytics that provide insight about a user's expense reporting. Examples of businesses that could benefit from automation of self-reporting services range from small companies to large multinational companies. The self-reporting services can support automated features ranging from making suggestions of data entry items for expense forms to fully automating the self-reporting process. The automation is supported with data captured by the user's consumer electronic devices in anticipation of a job-related journey and while the user is on that journey.

In some embodiments, a user can access consumer electronic devices (e.g., client devices 206) to coordinate or schedule a work-related journey. For example, a user may use a personal computer to arrange transportation for a journey and add the itinerary to an electronic calendar. The user may also have a smartphone running an app administered by a self-reporting service that can communicate with the user's personal computer to coordinate scheduling of the journey. For example, the user may reserve lodging for the journey with a local app and record the scheduled lodging in the electronic calendar that syncs the entries of transportation and lodging.

In some embodiments, the self-reporting service is accessible by administrators of the business that employs the user. The administrators can manage the expense reports and the service can maintain a customized database and other resources to facilitate the expense reporting process. For example, the self-reporting service may maintain or access a database with entries for business clients, which could be billed for expenses reported by employees. All this expense-related information can be obtained from various resources and synthesized to generate suggestions that aid users to complete self-report activities.

Figure 3:
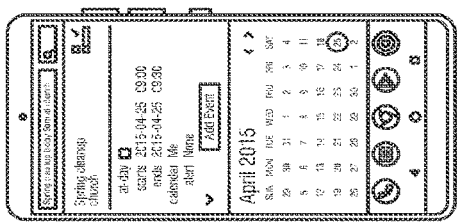
FIG. 3 is a block diagram that illustrates a user activity information pipeline for a self-reporting service according to some embodiments of the present disclosure.
Figure 3:
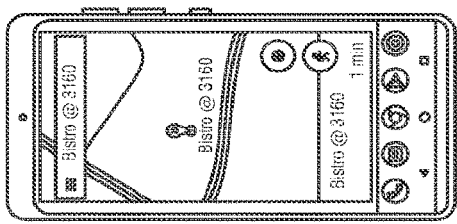
Figure 3:
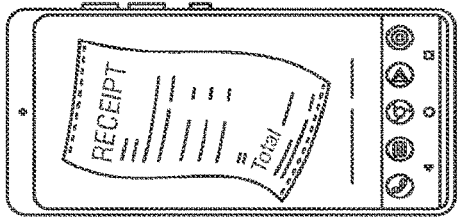
Figure 3:
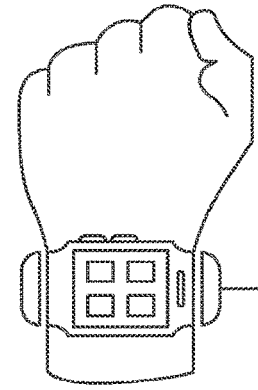
Figure 3:
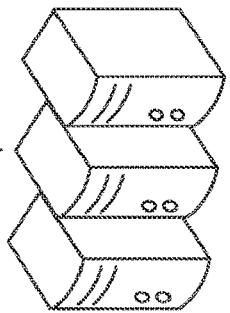

FIG. 3 is a block diagram that illustrates a user activity information pipeline for a self-reporting service that obtains data from a variety of sources. As shown, the user activity information pipeline 302 collects data from various sources for the self-reporting service 304. The user activity information pipeline 302 represents one or more means for collecting and communicating data to the self-reporting service 304. Examples include wired or wireless communications networks, sensors, etc. In the illustrated example, the sources of information include apps that run on a user's smartphone or smartwatch, which the user may carry along for at least a portion of a journey. Specific examples of sources of user activity information include calendar events, reminder items, motion sensor data, global positioning system (GPS) tracking, and geotagged photos captured by a mobile device. As referred to herein, "geotag" or "geotagging" refers to adding geographical identification metadata to media such as a photograph or video, website, SMS message, or the like, and is a form of geospatial metadata. This data usually consists of latitude and longitude coordinates, though they can also include altitude, bearing, distance, accuracy data, and place names, and perhaps a time stamp. The information managed or available by these sources is used to improve automation of data entry to generate accurate expense reports.

As illustrated, the sources of user activity information may include scheduling tools 306 such as an electronic calendar or reminder tools, location-based tools 308, image capture and geotagging tools 310, and/or other sources such as motion sensing tools 312. These are some sources of user activity information from the perspective of the user (e.g., employee). Other sources of user activity information include those provided by third party sources 314 (e.g., employer sources) such as a database of client, employee, matter, and task identifiers, as well as rules that control the self-reporting.

The calendar events of the scheduling tools 306 are features of calendaring software, which is software that provides users with an electronic version of a calendar. The calendar software may provide an appointment book, address book, and/or contact list. These tools are an extension of many of the features provided by time management software such as desk accessory tools and computer office automation systems. Calendaring is a standard feature of many PDAs and smartphones, and of many office suites for personal computers. A calendaring software may be a local application designed for individual use or may be a networked package that allows for the sharing of information between users.

A calendar event is created in an electronic calendar by initiating an event template that includes fields indicative of, for example, a subject, location, start-time, end-time, and includes the ability to attach files or include text associated with the event. The information input into the fields is used to schedule a calendar event. In some embodiments, the information contained in a calendar event can be extracted to dynamically update the suggested values of an expense report. For example, the "subject" information can be extracted and presented as an option for naming an expense report. The location, start-time, and end-time data can be used to modify other fields of an expense report.

A reminder of the scheduling tools 306 may include an alarm that is triggered at a specified time before an event starts. A notification allows a user to find out about changes to an event in the user's electronic calendar. A reminder includes information indicating when to show the reminder expressed in time increments before an event start time. A reminder may also indicate a delivery method to use. A reminder can be specified for a calendar or for an individual event. A user can set default reminders for each of the user's calendars; these defaults apply to all events within that calendar. However, users can also override the defaults for individual events, to replace them with a different set of reminders.

The information for expense reports and means for obtaining that information can be different for reminder items compared to calendar events. The information in calendar events is labelled such that it could be readily categorized for being imported into a self-reporting application of the self-reporting service 304. For example, the "location" of a calendar event field can be incorporated into any location field of the expense reporting template. In contrast, the substance of reminder items is usually text and/or images rather than labeled fields. As such, the expense reporting software performs a natural language analysis to detect useful information for expense reports.

The location-based tools 308 may capture GPS tracking data generated by a smartphone carried by a user. For example, a user on a journey from which one or more expense reports can be generated may carry a smartphone that utilizes GPS signals to estimate the location of the user during the trip. The location(s) can be captured by the smartphone and obtained by the expense report service to generate information about the user's whereabouts during the trip. The specific location(s) where the user stopped and the routes on which the user traveled can be recorded, as well as other metadata indicative of the mode of transportation taken by the user. For example, the user may have stopped at certain locations to eat meals and travelled on roads at a rate indicating vehicular transportation.

The location-based information for the self-reporting service 304 can be obtained from third-party applications resident on a smartphone to make use of existing tools. For example, apps such as GOOGLE MAPS running on a smartphone can record the location of a user and points of interest (POI) visited by the user. Accordingly, the self-reporting service 304 can obtain the expense-related information in a pre-processed format by using application programming interfaces (APIs) of existing third-party tools resident on the user's smartphone.

The location-based information for the self-reporting service 304 can be used for a variety of tasks to improve self-reporting. For example, the visited POI data can be used to populate suggested values for location fields of an expense report template when the user selects a mealtime expense report. In another example, the predicted mode of transportation can be used to suggest reporting a mileage travel expense. That is, the reporting software of the self-reporting service 304 may suggest creating an expense report for driving a vehicle between two locations and suggest an estimated distance that was traveled between those two locations. This data could also be compared against other data to avoid erroneous data entries. For example, the reporting software may compare an estimated navigation against other data indicating that the user utilized peer-to-peer ridesharing (e.g., LYFT, UBER) or a taxi cab, and prompt the user for more information.

The image capture and geotagging tools 310 include mechanisms for capturing images with a mobile device. In some embodiments, geotagged images are utilized to suggest values for self-reporting an expense based on the content included in the geotagged images. For example, a user may capture an image of a receipt. The image may be geotagged with a location associated with a restaurant. When the user loads the geotagged image of the receipt, the suggested values for an expense report may reflect the content of the geotagged image.

The motion sensing tools 312 can obtain data used to identify movements in a manner similar to a GPS system but at a smaller scale to understand local movements. For example, interacting with the smartphone by taking pictures while on a driven journey suggests that the user is not driving the vehicle. As such, the self-reporting service 304 may de-prioritize suggestions related to driving a vehicle over suggestions that the user utilized peer-to-peer ridesharing or a taxi cab.

The information that is utilized to suggest values for a report can be obtained or derived from a variety of sources that are not limited to the described examples. The purpose of this description is to illustrate a few examples of sources of information that could be used to ultimately facilitate self-reporting by creating a customized portal that can dynamically change to make suggestions for data entries that are presented in a prioritized manner, which reduces the cognitive burden on users to complete reports and reduces the burden on backend workers to process the completed reports.

The self-reporting service 304 could also suggest a customer to bill expenses based on a proximity to visited locations. A proximity threshold can be adjusted to reduce available choices down to a sensible minimum, e.g., narrow the search down to the nearest block/town/city, county/area, state/country, region/continent. For example, a UK-based consultant may have three customers in Holland and one in Belgium. When the consultant goes on a business trip to the Netherlands, the self-reporting service 304 may determine that it is more likely that the consultant went to visit the Dutch customer and present suitable suggestions accordingly.

In addition, the self-reporting software administered by the self-reporting service 304 can use historical data to improve the accuracy and detect expense types. For example, a receipt from an airport, which is detected from a geotagged image, is probably a "personal meal" or a "car rental" above anything else if the previous receipts from airports had similar expense types assigned to them. In addition, the self-reporting software can use optical character recognition (OCR) to process receipts and further analyze the contents of the receipts to better detect the "spent" values for a corresponding category and suggest relevant expense types when the user is inputting data into an expense report.

For example, a user may book flight tickets and lodging for a work-related journey. The flight and lodging itinerary may get added to the electronic calendar. The user may carry a handheld mobile device (e.g., smartphone) running a self-reporting app that collects data at various points throughout the user's journey. For example, the user may employ multiple modes of transportation (e.g., plane, train, automobile, subway) and visit multiple locations in route to a destination. The user may purchase food and take pictures of restaurant receipts.

Upon the user's return to the office, the user decides to file an expense report. The self-reporting service 304 may have collected expense-related information from various apps and tools that collected related data of the user's journey. The self-reporting service 304 can formulate suggestions that aid the user to complete an expense report. The suggestions may be based on the collected expense-related information. For example, the location-based information may include a location where the user had breakfast. The geographic location, restaurant, and predicted type of meal (e.g., breakfast) can be used to formulate suitable suggestions for an expense report.

When the user opens an expense reporting mobile app to create an expense report for the journey, the user interface of the app may display a form that includes various graphical control elements to receive input used to generate an expense report. For example, an expense form may include blank text fields to receive input regarding a title for the expense, type of expense, location, amount, etc.

The self-reporting app can suggest recent data sourced from the journey (and other sources) to generate a relatively comprehensive picture of events that can be expensed. The expense reporting tool can both facilitate input of relevant data into certain fields of an expense report form and suggest other expenses. For example, the user may use the self-reporting app to create an expense report for a meal. The service can cause the app to prioritize or sort terms/phrases sourced from events on the journey (e.g., dates, locations, receipts with expense types) to complete the expense report. The service can additionally enable the app to suggest an additional expense for mileage to the location where the meal was purchased and consumed.

The amount of automated assistance can vary according to user preferences or can be optimized to mitigate the risk of errors caused by user inputs or from excessive-automation. For example, generating an expense report automatically based on data sourced from a journey could create more problems than it solves. Specifically, any expense report generated automatically without user intervention is likely riddled with errors such that an administrator will later have to invest an unreasonable amount of time modifying the error-riddled expense report (see, e.g., FIG. 1). Moreover, a system that can automatically fill an expense report is undesirable because this requires significant intrusion into the user's privacy by needing to monitor and track a user's every move to collect enough data that would enable full automation. Accordingly, embodiments can facilitate the expense reporting with sufficient automation to improve the ease for entering relevant data and improve the accuracy of the resulting expense report without excessively automating the expense reporting process.

The automated portions of the disclosed self-reporting service can involve dynamically changing suggestions as inputs for an expense report. For example, an expense report form may include text entry boxes with dropdown lists of suggestions or a banner that lists different relevant suggestions depending on the selected control element of the form and any text input into a selected field. The suggestions presented for a field may include journey-specific suggestions, user-specific suggestions based on historical activity, and/or suggestions included in a database of standardized suggestions.

The customized suggestions are displayed in a manner to draw the user's attention to some suggestions over other suggestions. For example, the suggestions are presented in a prioritized manner by emphasizing suggestions formulated based on a recent journey, de-emphasizing suggestions formulated based on historical journeys, and further de-emphasizing suggestions that are not formulated based on the user's journeys.

A control element (e.g., widget) is a graphical component that a user can manipulate to create, edit, or read information on a graphical user interface (GUI). Each control element of a GUI facilitates a specific user-computer interaction. Specifically, control elements can involve the display of related items such as various list and canvas controls, initiation of actions and processes within the GUI (e.g., buttons, menus), navigation (e.g., links, tabs, scrollbars), and representing and manipulating data values (e.g., labels, check boxes, radio buttons, sliders, spinners). The arrangement and functions of control elements offer a visual language to represent information from different sources.

Figure 4D:
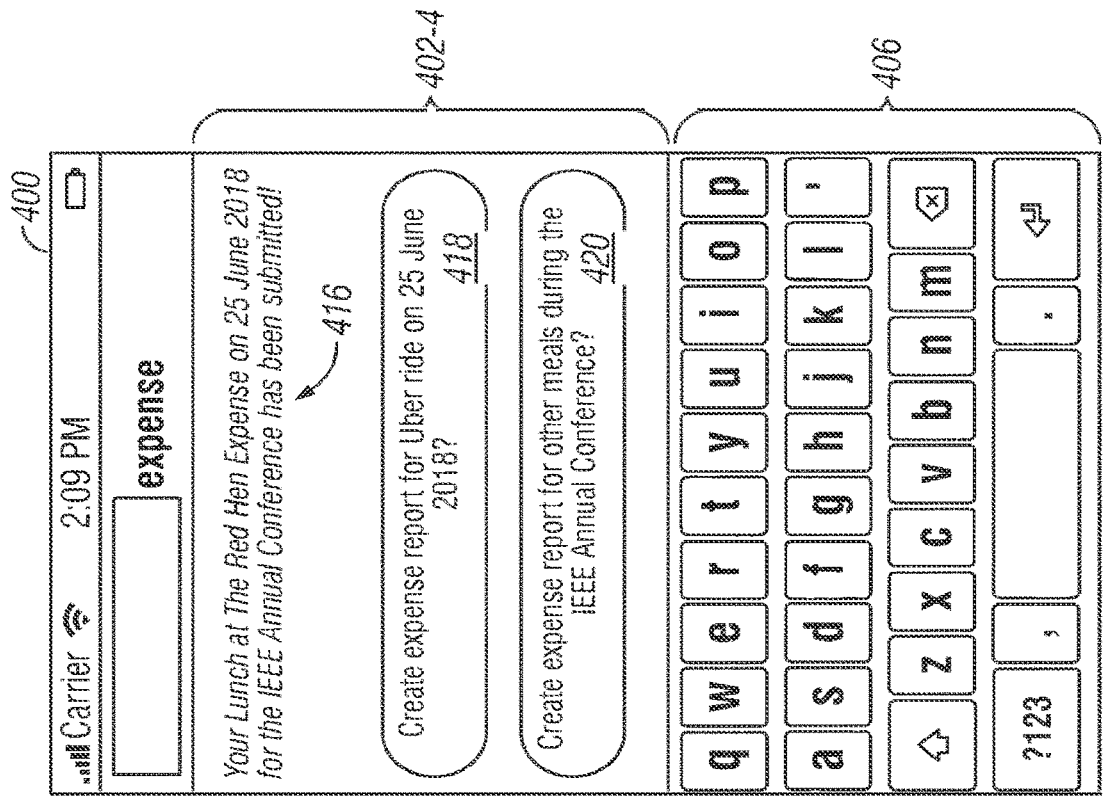
FIG. 4D illustrates another view of the GUI that presents suggested reporting events according to some embodiments of the present disclosure.
Figure 4C:
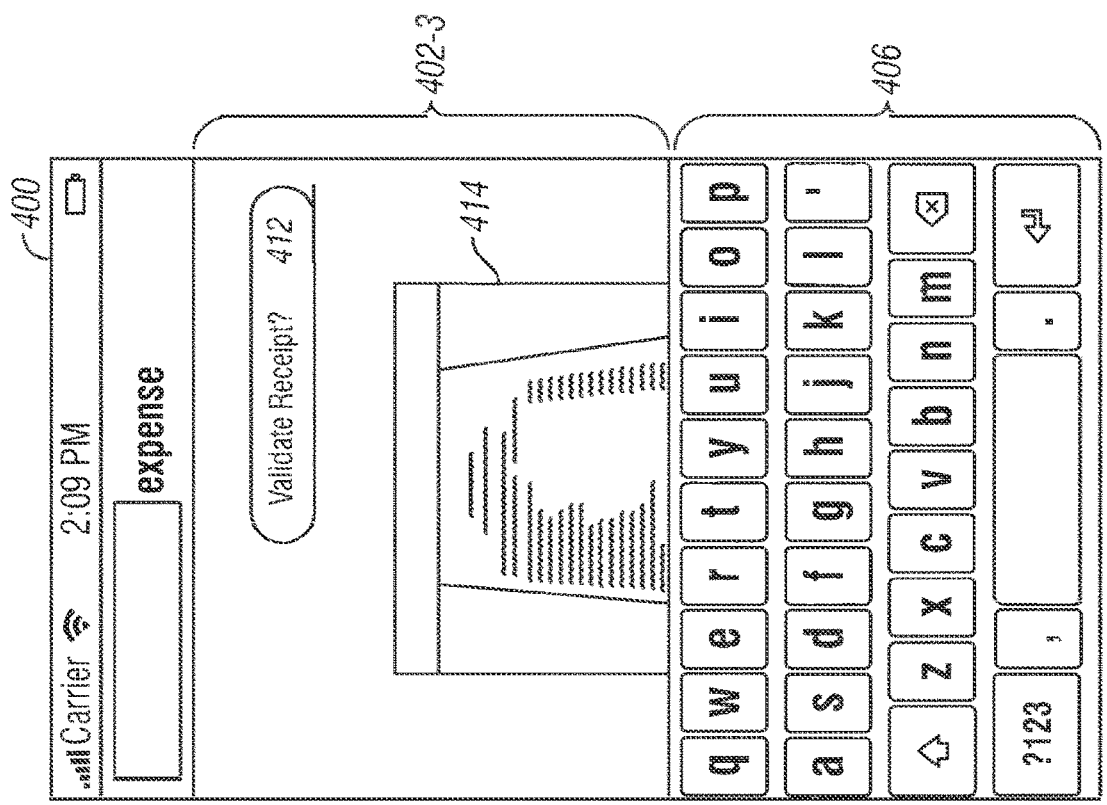
FIG. 4C illustrates another view of the GUI that presents a geotagged image used to formulate suggestions or validate inputs according to some embodiments of the present disclosure.

For example, FIGS. 4A through 4D illustrate different GUI views of a self-reporting app running on a handheld mobile device. The self-reporting app is part of a self-reporting service that displays suggestions in a prioritized manner. For example, FIG. 4A illustrates a GUI 400 that has distinct areas including a data entry area 402-1, a banner 404, and a virtual keyboard 406. The data entry area 402-1 has control elements 408-1 through 408-6 that are selectable to receive input via the virtual keyboard 406. For example, the control element 408-2 is a text box for an "Event Name" of an expense report. The control element 408-2 received a "C" input and maintains focus as indicated by the presence of the cursor. As such, input typed into the virtual keyboard 406 is displayed in the control element 408-2 after the "C" input. FIGS. 4B, 4C, and 4D also depict a data entry area, 402-2, 402-3, and 402-4, respectively.

The banner 404 is a control element that displays a group of prioritized suggestions for a selected control element 408 in the data entry area 402-1 to 402-4 (FIGS. 4A-4D). The group of suggested inputs are biased by the user input. For example, each suggested input in the banner 404 includes the "C" input of the selected control element 408-2. In some embodiments, any suggestion is automatically input into a selected control element 408 when the suggestion is selected in the banner 404 by the user.

The group of suggested inputs are presented in a biased manner where a primary suggestion is positioned in the middle of the banner 404. As shown, the "IEEE Annual Conference" suggestion is prioritized because it was formulated based on a calendar event associated with a recent journey taken by the user. Offset from the center, on opposite sides of the primary suggestion, are the "Engineering Conference" and "Management Conference" suggestions, respectively. These secondary suggestions were formulated based on the user's historical journey information. Hence, the user historically attends engineering conferences or management conferences. Lastly, the "Conference" and "Client Meeting" suggestions are generic suggestions that are not user-specific or journey-specific but are suitable event names that include the letter "C."

Therefore, some categories of suggestions are presented more favorably over others to aid or coach the user to accurately complete the expense form. In the illustrated example, the categories of suggestions include journey-specific suggestions, user-specific suggestions (not journey-specific), and generic suggestions. A user can scroll through the group of suggestions to see less prioritized suggestions in the banner 404 that are off-screen. Moreover, the presented suggestions can be dynamically adjusted while maintaining the priority of the categories as the user inputs more text into the control element 408-2. For example, the GUI 400 can be dynamically modified to present suggestions that are re-prioritized with updated information about recent journey(s), historical journey information, and generic information.

FIG. 4B illustrates another view of the GUI 400, which includes a dropdown list of prioritized suggestions for a selected control element 408-3. As shown, the control element 408-3 is a text box for the "Category" of the expense report and has a dropdown list 410 of suggested data entries. The suggestions for control element 408-3 are prioritized in a categorical manner like FIG. 4A but sorted in ascending order from top to bottom. Specifically, the suggestions near the control element 408-3, closer to the top of the dropdown list 410, are prioritized over any suggestions further from the control element 408-3, closer to the bottom of the dropdown list 410.

FIG. 4C illustrates another view of the GUI 400, which presents a geotagged image processed for formulating suggestions or validating user inputs. For example, clicking on the "Validate Receipt?" control element 412 will cause the self-reporting app to OCR (optical character recognition) the image of the receipt 414, and perform a natural language analysis of the content obtained via an OCR process, which is compared against user inputs to suggest new or corrected inputs.

FIG. 4D illustrates another view of the GUI 400, which presents suggested expense reports that are identified based on user activity information. In other words, unlike the examples of FIGS. 4A through 4C that present suggested inputs for a selected control element, FIG. 4D shows that expense reports can be suggested as well. For example, the self-reporting app presents a notification 416 that an expense report has been submitted. The self-reporting app also suggests additional expense reports including reporting an UBER ride 418 and reporting another meal for the same IEEE Annual conference 420. The suggested additional expense reports were formulated based on the user activity information.

Figure 5:
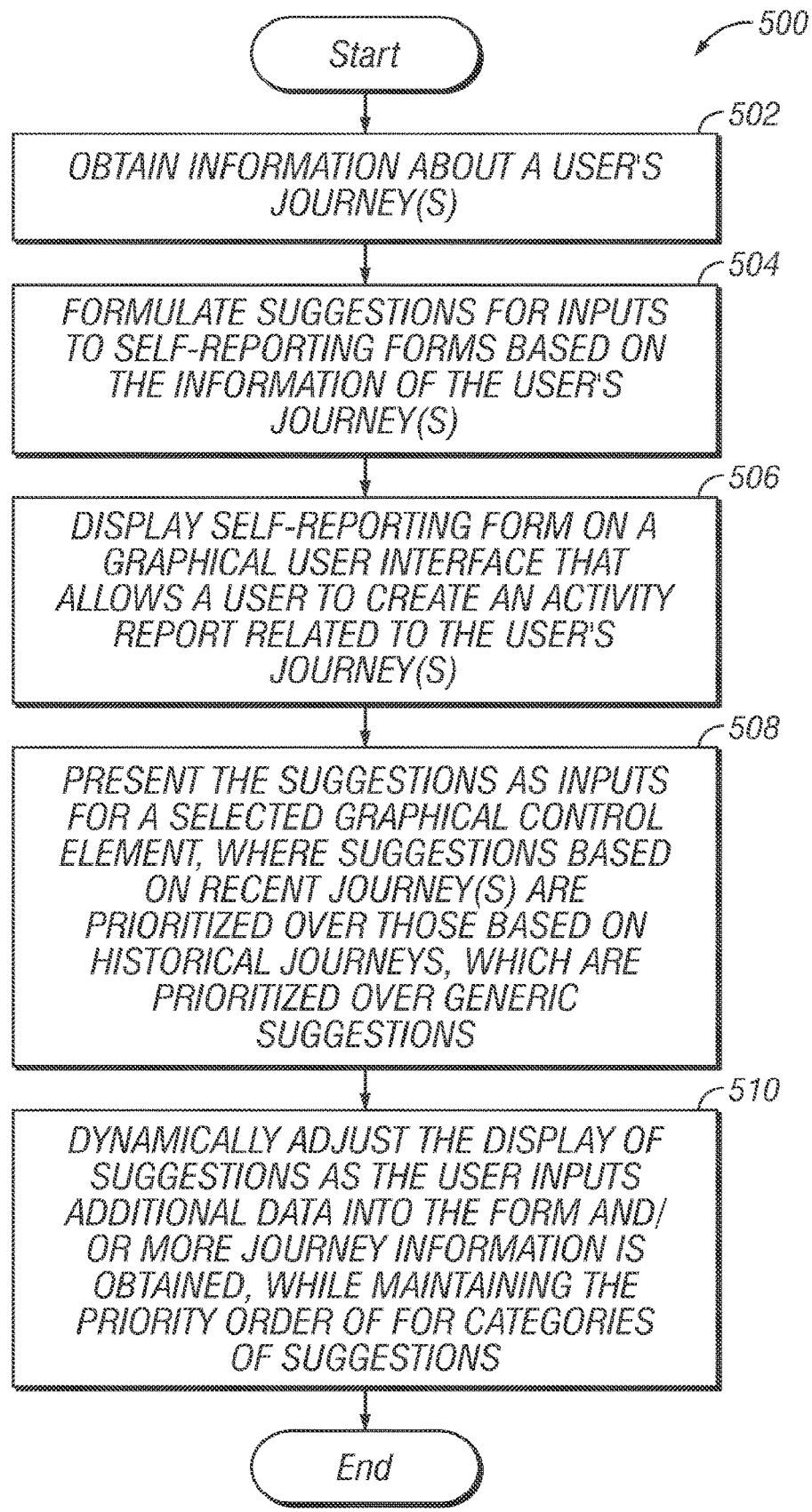
FIG. 5 is a flowchart of a process for self-reporting according to some embodiments of the present disclosure.

FIG. 5 is a flow chart of a process 500 for self-reporting user activities according to some embodiments of the present disclosure. In step 502, a self-reporting service obtains information of a user's journey(s). For example, the user activity information can be collected by tools resident on consumer electronic devices that already collect the information for other purposes. As such, the collected information may be pre-processed for other purposes. In another example, the information is collected by a tool specifically configured as an agent of the self-reporting service. The collected user activity information can be funneled through an information pipeline to the self-reporting service.

In step 504, the self-reporting service formulates suggested inputs (e.g., data entries) for self-reporting forms accessible by a user based on the user activity information. In one example, the self-reporting service formulates suggestions that are journey-specific. For example, the self-reporting service may obtain calendar data from the user's electronic calendar, where the obtained calendar data is indicative of a journey taken by the user. The self-reporting service may formulate suggestions based on that calendar data. In another example, the self-reporting service may obtain reminder data that includes textual content input by the user. The self-reporting service may perform a natural language textual analysis of the textual content to detect information indicative of a journey taken by the user. The self-reporting service then formulates suggested input based on the obtained reminder data.

In another example, the self-reporting service may obtain location-based information captured during a journey by the user. The location-based information may be indicative of a route traveled by a user, a distance traveled, and a mode of transportation utilized for the journey. The self-reporting service then formulates suggestions based on the obtained location-based information. In another example, the self-reporting service obtains geotagged images captured during a journey by the user. A geotag is indicative of a geographic location where an image was captured. In yet another example, the self-reporting service obtains motion data captured during a journey by the user. The motion data may be indicative of the user's motion. The self-reporting service can then formulate suggested inputs based on a combination of the obtained information.

In some embodiments, the self-reporting service can formulate suggestions that are user-specific but not necessarily journey-specific. For example, the self-reporting service can aggregate historical information regarding a user's prior journeys. The self-reporting service can formulate suggestions based on the aggregate historical information. Lastly, the self-reporting service can have a database of generic suggested inputs that are not specifically related to any journey taken by the user.

In step 506, a user operating a computing device can initiate creation of a report of user activity for submission to the self-reporting service. The computing device may be a handheld electronic device that presents the suggestions formulated based on data obtained by the same or another handheld electronic device carried by the user during journeys. In some embodiments, the handheld electronic device is a smartphone and the self-reporting service is a cloud-based service. For example, a self-reporting app running on the smartphone may communicatively couple to the self-reporting service over a network. The self-reporting service can provide suggested inputs to present on a form of the app, which includes control elements that can accept inputs from the user.

In step 508, suggested inputs are presented in a prioritized manner for a selected control element. A "prioritized manner" refers to presenting the suggested inputs in a way that more readily draws the user's attention. For example, prioritized suggestions can be presented closer to a center of the display of the handheld electronic device compared to other suggestions. In other examples, prioritized suggestions are presented with larger font sizes, emphasized, highlighted, or in any other way that draws the user's attention to the prioritized suggestions over other suggestions that are also presented to the user. The user can select any of the presented suggested inputs regardless of the way they are presented for input into the selected control element.

The suggested inputs may be prioritized in accordance with a category in which particular inputs belong. For example, suggested inputs that are formulated based on any journey taken by the user (e.g., journey-specific suggestions) may be prioritized for display over any generic suggestions that are unrelated to any journey taken by the user. In some embodiments, any suggested inputs that are formulated based on the user's most recent journey are prioritized over any suggested inputs that were formulated based on other prior journeys by the user, which are prioritized over any remaining suggested inputs.

In some embodiments, the suggested inputs are presented in response to input to a selected control element. For example, suggested data entries can be presented as a user enters textual characters via a virtual keyboard into a selected text entry box. Hence, in one example, the self-reporting form is an expense report form and the selected control element is a graphical text entry box. In some embodiments, the suggestions are presented in a dropdown list such that any prioritized suggestions are presented closer to the selected control element relative to any other suggestions. In another example, a self-reporting app displays a banner or ribbon with prioritized suggestions presented closer to a center of the banner or ribbon compared to generic suggestions that are presented toward the end of the banner or ribbon at the edge of the display.

In step 510, the presented suggestions are dynamically adjusted in response to additional user inputs (e.g., via a virtual keyboard) or additional user activity information. Specifically, suggestions are added or removed and/or re-prioritized based on additional user input or journey information. In some embodiments, the suggestions presented to a user are sorted and/or prioritized based on the user's activity information and/or preferences but the suggested inputs themselves are not necessarily formulated based on the user's activity information. In other words, the user's activity information is not used to create or change suggested inputs but can influence the way suggested inputs are presented, where the suggested inputs are predetermined.

Figure 6:
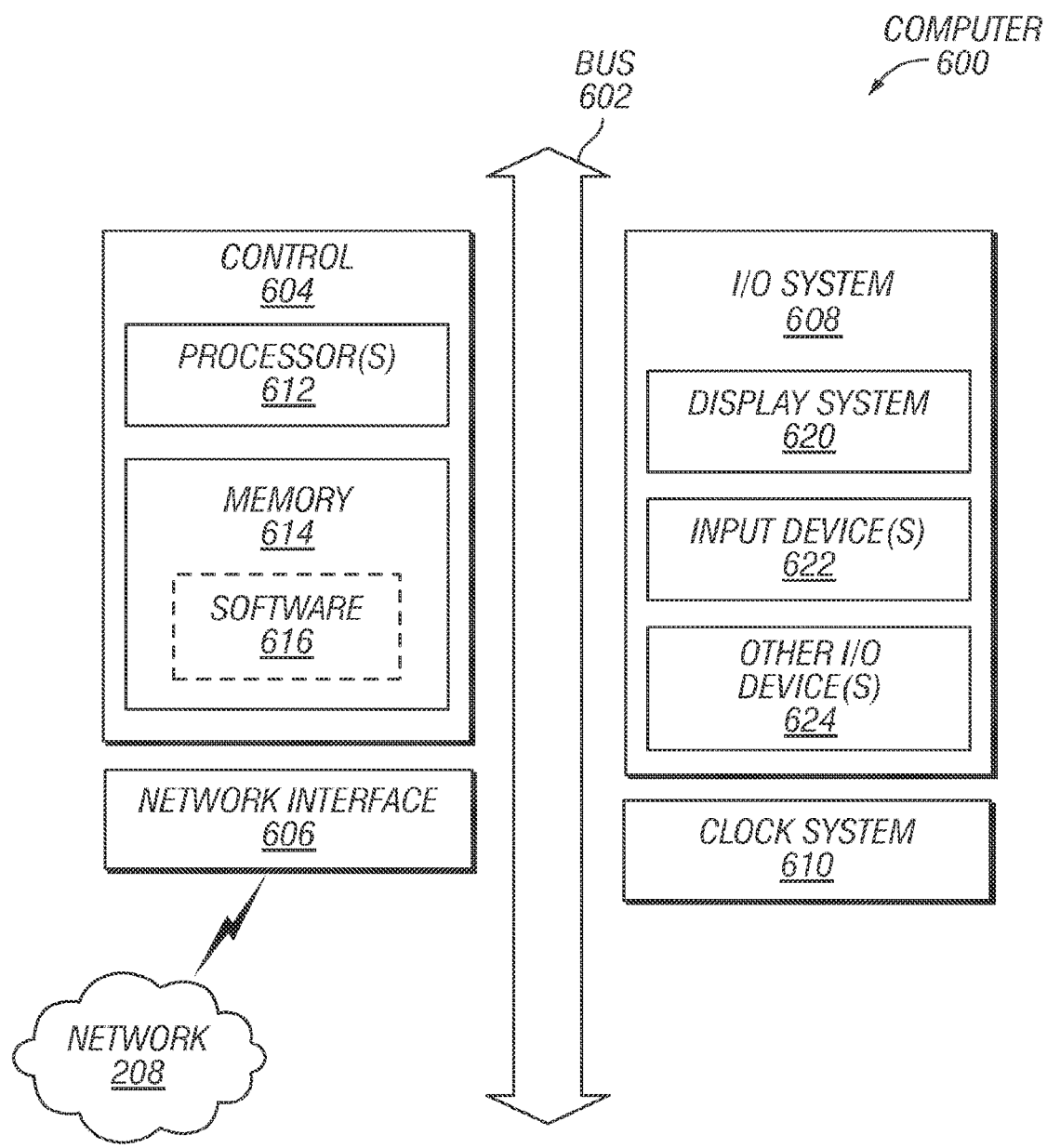
FIG. 6 is a block diagram that illustrates a computer operable to implement the disclosed technology according to some embodiments of the present disclosure.

FIG. 6 is a block diagram that illustrates a computing device operable to implement the disclosed technology. As shown, the computing device 600 (e.g., client device 206, service provider server 204, cloud based cloud-based resource 202) includes a bus 602 that is operable to transfer data between hardware and/or software components. These components include a control 604 (e.g., processing system), a network interface 606, an input/output (I/O) system 608, and a clock system 610. The computing device 600 may include other components that are not shown nor further discussed for the sake of brevity. One of ordinary skill in the art will understand any hardware and software that is included but not shown in FIG. 6.

The control 604 includes one or more processors 612 (e.g., central processing units (CPUs)), application specific integrated circuits (ASICs), and/or field programmable gate arrays (FPGAs), and memory 614 (which may include software 616). For example, the memory 614 may include volatile memory, such as random-access memory (RAM) and/or non-volatile memory, such as read-only memory (ROM). The memory 614 can be local, remote, or distributed.

A software program (e.g., software 616), when referred to as "implemented in a computer-readable storage medium," includes computer-readable instructions stored in the memory (e.g., memory 614). A processor (e.g., processor 612) is "configured to execute a software program" when at least one value associated with the software program is stored in a register that is readable by the processor. In some embodiments, routines executed to implement the disclosed embodiments may be implemented as part of operating system (OS) software (e.g., Microsoft Windows, Linux) or a specific software application, component, program, object, module, or sequence of instructions referred to as "computer programs."

As such, computer programs typically comprise one or more instructions set at various times in various memory devices of a computer (e.g., computing device 600), which, when read and executed by at least one processor (e.g., processor 612), will cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., memory 614).

The network interface 606 may include a modem or other interfaces (not shown) for coupling the computing device 600 to other computers over the network 208. The I/O system 608 may operate to control various I/O devices, including peripheral devices such as a display system 620 (e.g., a monitor or touch-sensitive display) and one or more input devices 622 (e.g., a keyboard and/or pointing device). Other I/O devices 624 may include, for example, a disk drive, printer, scanner, or the like. Lastly, the clock system 610 controls a timer for use by the disclosed embodiments.

Operation of a memory device (e.g., memory 614), such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

What is claimed is:
1. A computer-implemented method comprising:
obtaining user journey information based on a combination of 1) real-time user location tracking data from a computing device carried by the user during a journey or geotagged image data captured during the journey by the user; and (2) electronic scheduling data or motion sensing data;

formulating a journey-specific suggestion based on the obtained user journey information, the journey-specific suggestion being indicative of a recent journey taken by the user;

formulating a user-specific suggestion based on the obtained user journey information, the user-specific suggestion being indicative of historical journeys taken by the user;

formulating a generic suggestion irrespective of the user journey information;

causing display of a user interface on a display of the computing device;

receiving input from the computing device, the received input including selection of a control element on the user interface displayed on the computing device and textual input for the selected control element; and in response to the received input, causing prioritized display of a plurality of suggestions as input for the selected control element such that the formulated journey-specific suggestion is prioritized over the formulated user-specific suggestion, which is prioritized over the formulated generic suggestion.

2. The computer-implemented method of claim 1 further comprising:

receiving additional textual input for the control element; and in response to receiving the additional textual input, dynamically adjusting the prioritized display while maintaining display of any suggestion formulated based on the user journey information prioritized over any formulated generic suggestion.

3. The computer-implemented method of claim 1, wherein at least part of the user journey information is obtained from the computing device.

4. The computer-implemented method of claim 3, wherein the computing device is a smartphone, and a cloud-based service determines the prioritized display.

5. The computer-implemented method of claim 1, wherein the computing device is a handheld electronic device, and any prioritized suggestions are formulated based on information obtained from one or more handheld electronic devices carried by the user during the journey.

6. The computer-implemented method of claim 1, wherein the user-specific suggestion is formulated by:

aggregating historical information regarding a plurality of historical journeys taken by the user; and formulating one or more of the plurality of suggestions based on the aggregated historical information.

7. The computer-implemented method of claim 1, wherein the formulated journey-specific suggestion or the formulated user-specific suggestion includes a prioritized suggestion.

8. The computer-implemented method of claim 7, wherein the computing device is a handheld electronic device and the prioritized suggestion is formulated based on information obtained from a mobile sensor, the mobile sensor being associated with the handheld electronic device.

9. The computer-implemented method of claim 7, wherein the prioritized suggestion is generated by:

obtaining calendar information from an electronic calendar of the computing device, wherein the calendar information is indicative of a journey taken; and formulating one or more suggestions based on the calendar information.

10. The computer-implemented method of claim 7, wherein the prioritized suggestion is generated by:

obtaining the real-time user location tracking data from the computing device, the real-time user location tracking data being indicative of a route, a distance, and a mode of transportation; and formulating one or more suggestions based on the real-time user location tracking data.

11. The method of claim 1, wherein the geotagged image data comprises geographical identification metadata, the geographical identification metadata comprising at least one of latitude and longitude coordinates, altitude, bearing, distance, accuracy data, a place name, and a time stamp.

12. A system comprising:

a processor; and a memory for storing executable instructions that, when executed by the processor, cause the system to perform a method, the method comprising:

obtaining user journey information based on a combination of 1) real-time user location tracking data from a computing device carried by the user during a journey or geotagged image data captured during the journey by a user; and (2) electronic scheduling data or motion sensing data;

formulating a journey-specific suggestion based on the obtained user journey information, the journey-specific suggestion being indicative of a recent journey taken by the user;

formulating a user-specific suggestion based on the obtained user journey information, the user-specific suggestion being indicative of historical journeys taken by the user;

formulating a generic suggestion irrespective of the user journey information;

causing display of a user interface on a display of the computing device;

receiving input from the computing device, the received input including selection of a control element on the user interface displayed on the computing device and textual input for the selected control element; and in response to the received input, causing prioritized display of a plurality of suggestions as input for the selected control element such that the formulated journey-specific suggestion is prioritized over the formulated user-specific suggestion, which is prioritized over the formulated generic suggestion.

13. The system of claim 12, wherein the method further comprises:

receiving additional textual input for the control element; and in response to receiving the additional textual input, dynamically adjusting the prioritized display while maintaining display of any suggestion formulated based on the user journey information prioritized over any formulated generic suggestion.

14. The system of claim 12, wherein at least part of the user journey information is obtained from the computing device.

15. The system of claim 12, wherein the computing device is a smartphone, and a cloud-based service determines the prioritized display.

16. The system of claim 12, wherein the computing device is a handheld electronic device and any prioritized suggestions are formulated based on information obtained from one or more handheld electronic devices carried by the user during the journey.

17. The system of claim 12, wherein the user-specific suggestion is formulated by:

aggregating historical information regarding a plurality of historical journeys taken by the user; and formulating one or more of the plurality of suggestions based on the aggregated historical information.

18. The system of claim 12, wherein the formulated journey-specific suggestion or the formulated user-specific suggestion includes a prioritized suggestion.

19. The system of claim 18, wherein the computing device is a handheld electronic device and the prioritized suggestion is formulated based on information obtained from a mobile sensor, the mobile sensor being associated with the handheld electronic device.

20. The system of claim 18, wherein the prioritized suggestion is generated by:

obtaining calendar information from an electronic calendar of the computing device, wherein the calendar information is indicative of a journey taken; and formulating one or more suggestions based on the calendar information.

21. The system of claim 18, wherein the prioritized suggestion is generated by:

obtaining the real-time user location tracking data from the computing device, the real-time user location tracking data being indicative of a route, a distance, and a mode of transportation; and formulating one or more suggestions based on the real-time user location tracking data.

22. The system of claim 12, wherein the geotagged image data comprises geographical identification metadata, the geographical identification metadata comprising at least one of latitude and longitude coordinates, altitude, bearing, distance, accuracy data, a place name, and a time stamp.

\* \* \* \* \*

UNITED STATES PATENT AND TRADEMARK OFFICE
CERTIFICATE OF CORRECTION

PATENT NO. : 12,299,752 B2  
APPLICATION NO. : 18/196397  
DATED : May 13, 2025  
INVENTOR(S) : Aleksei Murashin Page 1 of 1

It is certified that error appears in the above-identified patent and that said Letters Patent is hereby corrected as shown below:

In the Specification

In Column 13, Line 30, the words "cloud based cloud-based" should be replaced with "cloud-based".

Signed and Sealed this  
Tenth Day of February, 2026

John A. Squires  
*Director of the United States Patent and Trademark Office*